(12) United States Patent
Klahn et al.

(10) Patent No.: US 12,484,117 B2
(45) Date of Patent: Nov. 25, 2025

(54) GAS HEATER HEATING ELEMENT PRODUCTION METHOD

(71) Applicant: Sunfire GmbH, Dresden (DE)

(72) Inventors: Christian Klahn, Dresden (DE);
Sebastian Becker, Dresden (DE);
Dietmar Rüger, Bannewitz (DE)

(73) Assignee: SUNFIRE GMBH, Dresden (DE)

( * ) Notice: Subject to any disclaimer, the term of this patent is extended or adjusted under 35 U.S.C. 154(b) by 653 days.

(21) Appl. No.: 17/802,553

(22) PCT Filed: Oct. 26, 2020

(86) PCT No.: PCT/EP2020/080000
§ 371 (c)(1),
(2) Date: Aug. 26, 2022

(87) PCT Pub. No.: WO2021/170260
PCT Pub. Date: Sep. 2, 2021

(65) Prior Publication Data
US 2023/0079681 A1    Mar. 16, 2023

(30) Foreign Application Priority Data

Feb. 26, 2020   (EP) .................................. 20159612

(51) Int. Cl.
*H05B 3/48* (2006.01)
*H05B 3/42* (2006.01)

(52) U.S. Cl.
CPC ......... *H05B 3/42* (2013.01); *H05B 2203/014* (2013.01); *H05B 2203/022* (2013.01)

(58) Field of Classification Search
CPC ...................................................... H05B 3/46
See application file for complete search history.

(56) References Cited

U.S. PATENT DOCUMENTS

| | | | |
|---|---|---|---|
| 2016/0273801 A1* | 9/2016 | Kapila | ............ H05B 3/16 |
| 2017/0094725 A1 | 3/2017 | Mann et al. | |
| 2022/0394821 A1* | 12/2022 | Tong | ............ H05B 3/14 |

FOREIGN PATENT DOCUMENTS

| | | | | |
|---|---|---|---|---|
| CA | 2914162 C | * | 1/2023 | ........... F24C 7/043 |
| CN | 1531837 A | | 9/2004 | |

(Continued)

OTHER PUBLICATIONS

China National Intellectual Property Administration; Notification of the First Office Action; Application No. 202080097571.5; 9 pages.

(Continued)

*Primary Examiner* — Woody A Lee, Jr.
(74) *Attorney, Agent, or Firm* — Barclay Damon LLP (57) ABSTRACT

A method of manufacturing a gas heater heating element including a support and channel structure with a plurality of channels formed in the monolith includes shaping an electric heating element and at least partially coating the electric heating element with at least one coating material. The at least partially coated electric heating element is positioned in a mold for producing the monolith. The monolith is produced and surrounds the at least partially coated electric heating element. The coating material of the at least partially coated electric heating element is removed. The gas heater heating element includes at least one electric heating element in the monolith and the electric heating element is guided in the plurality of channels of the support. Heat within the plurality of channels is configured to be transferred by the electric heating element to a gas flowing through the plurality of channels to heat the gas.

16 Claims, 9 Drawing Sheets

(56) References Cited

FOREIGN PATENT DOCUMENTS

| CN | 106465488 | A | | 2/2017 | | |
|---|---|---|---|---|---|---|
| CN | 108489087 | A | | 9/2018 | | |
| CN | 118317707 | A | * | 7/2024 | ............... | H05B 1/00 |
| DE | 2451175 | A1 | | 5/1976 | | |
| DE | 10142768 | A1 | | 5/2002 | | |
| DE | 102014102474 | A1 | * | 8/2015 | ............ | F24H 3/002 |
| EP | 1191002 | A1 | | 3/2002 | | |
| EP | 2926623 | B2 | | 5/2019 | | |
| EP | 3873173 | A1 | * | 9/2021 | ............... | H05B 3/42 |
| EP | 4174294 | A1 | * | 5/2023 | ............ | F01N 3/027 |
| GB | 499074 | | | 1/1939 | | |
| GB | 881237 | A | * | 11/1961 | ............. | H05B 3/283 |
| WO | WO-2024251944 | A1 | * | 12/2024 | ............ | H05B 3/283 |

OTHER PUBLICATIONS

PCT/EP2020/080000; International Filing Date Oct. 26, 2020; International Search Report and Written Opinion; Date of Mailing Jan. 20, 2021 (10 pages).

PCT/EP2020/080000; International Filing Date Oct. 26, 2020; English Translation of International Search Report; Date of Mailing Jan. 20, 2021 (2 pages).

\* cited by examiner

GAS HEATER HEATING ELEMENT PRODUCTION METHOD

CROSS REFERENCE TO RELATED INVENTION

This application is a national stage application pursuant to 35 U.S.C. § 371 of International Application No. PCT/EP2020/080000, filed on Oct. 26, 2020, which claims priority to, and benefit of, European Patent Application No. 20159612.9, filed Feb. 26, 2020, the entire contents of which are hereby incorporated by reference.

TECHNOLOGICAL FIELD

The invention relates to a gas heater heating element production method, wherein the gas heater heating element has at least one electric heating element in a monolith, a support and channel structure with a plurality of channels is formed in the monolith, the electric heating element is guided in the channels of the support and channel structure, heat within the channels can be transferred by the heating element to a gas flowing through the channels to heat the gas and/or to achieve high gas temperatures. The gas heater is conceived in particular for a vertical through-flow, but also for horizontal use, as well as in particular for gas temperatures from 800° C. to 1200° C. The gas heater is superior to conventional heaters due to its geometry with regard to reliably reaching the desired gas temperature in the mentioned temperature range and simultaneously comparably long operation duration until the heating wire fails.

BACKGROUND

Gas heater heating elements have been disclosed in patent EP 2 926 623 B2, "Heating Element and Process Heater," wherein the manufacturing method is completely new.

The publication EP 2 926 623 B2 discloses a heating element for heating gases to high temperatures, with at least one tube designed for the through-flow of hot gas or respectively gas to be heated and an electrical heating wire in the tube, which is designed for the transfer of heat to the gas flowing past the heating wire.

The publication also relates to a process heater having a housing with a gas supply and a gas discharge, a heating chamber between the gas supply and the gas discharge for receiving a heating element, and electrical connections for at least one heating element. Corresponding heating elements have been known for a long time. They consist of at least one tube through which gas is to flow, which tube is open at both sides for the purpose of the through-flow, wherein a heating wire, past which the gas flows and which is heated by the direct contact with the heating wire, is arranged in the tube.

According to EP 2 926 623 B2, the term heating wire is used as an umbrella term both for relatively thin coiled wires and for heating rods according to the invention with a corresponding longitudinal axis which extends substantially along or parallel to the axis of the tube and fills the tube so that only a relatively small, thin distance of maximally 10 mm and preferably much less, even when it can be larger at points, remains between the heating rod and the tube wall.

The term tube in publication EP 2 926 623 B2 is defined as a hollow space with an inlet and an outlet opening, which corresponds to the support and channel structure from this document.

Different types of heating elements with various production methods are known from the prior art.

The heating element from EP 2 926 623 B2 is currently produced, and thus this appears to be the only executable version, from bent heating wire and extruded ceramic rods, which form gas channels. The ceramic rods are then arranged next to each other with as little space between them as possible, so that a minimal bypass flow is formed. The gas to be heated flows along the heating wire through the ceramic rods. To prevent the bypass flow, a ceramic block with multiple bores can also be used instead of individual ceramic rods. The publication also alternatively proposes filling the spaces between the ceramic rods with a suitable material in a gas-tight manner or using cover plates.

The production of the heating elements for the gas heater involves a lot of manufacturing effort and high manufacturing costs from, among other things, the detailed structure and the cost-intensive ceramic with regard to manufacturing and materials used. The vertical installation of the heating elements and the vertical gas through-flow are technically complicated and thus again cost-intensive to produce. The realization of large, powerful gas heaters cannot be implemented in a practicable and economical manner with the production method according to the prior art of the heating elements from EP 2 926 623 B2. The content of EP 2 926 623 B2 is also known from the publication DE 10 2014 102 474 A1.

The publication DE 101 42 768 A1 describes a method for producing ceramic brake disks from a green body, consisting of SMC with reinforcing fibers and subsequent pyrolysis and melt infiltration. To create a single-piece green body which has very complicated internal hollow spaces after pyrolysis, the method comprises producing the green body from a sandwich of SMC, thermoplastic inlay, SMC in a work step in a tool while applying pressure and temperature, wherein the inlay fills out the green body in its entire surface and is designed as a result of breakthroughs such that the upper and lower SMC layers are connected to each other at least at points.

In the publication, the ceramic is generated by sintering a green body. The required cooling channels in the ceramic brake disks are generated by burning out a sacrificial material. The publication refers exclusively to the production of ceramic brake disks. By burning out the sacrificial material, cooling channels are exposed, which are also used exclusively for this. No heating wire is introduced into the channels of the ceramic body.

The publication DE 24 51 175 A1 discloses complex ceramic heating elements of an expedient geometric design and a cross-section with a favorable section modulus, in which metallic heating conductors of determinable output, for one- to three-phase connection types, are sintered into dense, temperature- and temperature change- (shock-)resistant, corrosion-immune, physiologically neutral, dielectric ceramic materials, as energy conductors for heating liquids, gases, and solid substances. The heating elements can be dipped into these mediums and/or these mediums can flow through them. The heating output and use duration of these heating elements surpass conventional designs. Production methods and suitable ceramic materials are described.

In the publication, a ceramic heater heating wire composite product is produced using a continuous casting method and by sintering the ceramic. Flow channels are formed into the ceramic as separate channels. The space around the heating wires is explicitly tight to prevent contact with the medium to be heated. The flow channels are not generated by melting out/burning out a sacrificial material, but rather are formed into the ceramic by the continuous casting method.

The publication EP 1 191 002 A1 describes the production of an aluminum nitride sintered body with excellent mechanical strength, in which ceramic particles are prevented from detaching from the surface and/or the side of the particles and the generation of free particles is therefore suppressed. The sintered aluminum nitride sintered body contains sulfur.

The sintered body serves to produce a ceramic heater and is produced using a ceramic mold casting method. The ceramic heater is used as a radiant heater for heating silicon wafers. Due to the high purity requirements for the silicon wafers, a special selection of the ceramic material takes place.

In the publication, it is exclusively a radiant heater for silicon wafers and not a gas heater. No gas flow channels are generated by burning out a sacrificial material.

The publication US 2016/273801A1 discloses a gas heater heating element having a monolith/monolithic body in a support and channel structure and at least one continuous heating element, guided through the support and channel structure in the monolith. Such a gas heater heating element is also known from the publication GB 499 074 A. However, no suitable manufacturing method for such a gas heater heating element is indicated.

The problems in the prior art are primarily that the production of the heating elements for a gas heater are both time- and cost-intensive and the installation is technically complicated.

BRIEF SUMMARY OF THE INVENTION

The object of the present invention is to provide a production method for gas heater heating elements that is practicable both for realizing smaller and larger, more powerful gas heater heating elements and that can be implemented economically due to reduced manufacturing effort and reduced manufacturing costs.

An embodiment of a method for manufacturing a gas heater heating element is provided wherein the gas heater heating element has at least one electric heating element in a monolith, a support and channel structure with a plurality of channels is formed in the monolith, the electric heating element is guided in the channels of the support and channel structure, heat within the channels can be transferred by the electric heating element to a gas flowing through the channels to heat the gas and/or to achieve high gas temperature. The method of manufacturing includes shaping the electric heating element, coating the electric heating element with at least one coating material at least in portions or completely and introducing the coated electric heating element into a mold for producing a monolith. The monolith surrounding the coated electric heating element is produced and the coating material of the electric heating element is removed.

With this method, it is possible for the first time to produce a corresponding gas heater heating element cost-effectively. In particular, even the dimensioning no longer plays a role, since this disclosed method makes it possible to economically realize large and also small gas heater heating elements.

Producing the channel structure before the actual production of the monolithic structure can be emphasized as a particular advantage of the production method disclosed here. By removing the coating material after the production of the monolithic structure, no channels have to be introduced into the monolithic structure after its production, which would then have to be finished with the corresponding electric heating elements. Therefore, simply coating the electric heating element before the production of the monolith for the defined formation of the later space by the coating to be removed represents a special production step.

The gas heater heating element production process according to the invention significantly reduces costs for the production of the gas heater heating element, since the manufacturing effort and the manufacturing time are reduced. It is now possible to use continuous, meaning single piece gas heater heating elements that are manufactured by a machine.

In contrast to the use of ceramic rods known from the prior art for producing a support and channel structure, a considerable reduction in the number of parts is effected. This enables a self-supporting structure, which means the combination of the electric heating element with the support and channel structure into one component. In addition, additional possible functional combinations, such as thermal insulation, electrical insulation, gas conduction, or catalyst support structure, are given.

Additional embodiments of the production method are listed below, which further improve the previously demonstrated method and can also further specialize it.

In an embodiment, the electric heating element can be configured in particular as a heating wire and/or as a heating wire with a variable diameter and/or as a heating wire with a variable geometric structure and/or multiple different heating wires and/or as a heating lattice and/or as heating lattice structures. As a result, different amounts of heat can be introduced in different areas or portions of the gas heater heating element depending on the heating element geometry. In particular, the electric heating element can be designed to be arranged and/or shaped homogeneously or inhomogeneously or homogeneously in portions and inhomogeneously in portions, in order to meet corresponding requirements for the required amount of energy.

In an embodiment, the electric heating element and in particular the heating wire can be formed in any way and arranged with different density. In a special version, an inhomogeneous distribution of the electric heating elements within the gas heating heater can also be realized, which can counteract a possible non-uniform heating of the gas, for example in edge regions of the heater. For this purpose, the heater can be designed with the electric heating elements corresponding to the flow profiles. To further even out the temperature distribution, reflector elements for reflecting thermal radiation can be embedded or attached in edge regions and/or in the outside region of the monolithic structure.

Heating wires, heating plates, and heating rods as well as heating lattices and combinations of the aforementioned can be considered as electric heating elements. Other special embodiments, however, are also possible.

Furthermore, in an embodiment, the electric heating element can be formed from three portions, namely a first connecting portion, which is formed outside the monolith and on a gas inflow side, a channel portion, which is formed inside the monolith, and a second connecting portion, which is outside the monolith and on a gas outflow side. As a result, the individual heating wires or respectively electric heating elements inside the monolith or respectively the monolithic structure are correspondingly electrically connected outside the monolith structure. A mechanical connection between multiple segments can also take place as a result, or, however, also take place in the channels of the monolithic structure.

An embodiment of manufacturing the monolith using a casting mold includes inserting the shaped and coated electric heating element into the casting mold and filling the casting mold with removable filling material until the first connecting portion of the coated electric heating element is completely covered. The removable filling material is cured and cast into the casting mold so that the second connecting portion of the coated electric heating element remains uncast, with a material which can be cured and is temperature-resistant at temperatures higher than 800° C., and has a high electrical resistance and high thermal conductivity. The removable filling material is removed and the temperature-resistant material is fired.

Concrete, for example, or also another ceramic embedding material that meets the requirements can be used as the temperature-resistant material for casting into the casting mold. The material is introduced into the casting mold by casting and is then sufficiently cured for the following process steps until the required strength is reached. This prevents the channel and support structure to be formed from being deformed in an uncontrolled manner during the removal of the filling material or the firing.

Furthermore, the production of the monolith can alternatively take place in a press mold including inserting the shaped and coated electric heating element into a press mold and filling the press mold with a pressure transfer material until the first connecting portion of the coated electric heating element is completely covered. The press mold is filled with a sintering material which forms a green body so that the second connecting portion of the coated electric heating element remains unfilled. The green body is temperature-resistant at temperatures higher than 800° C., and has a high electrical resistance and a thermal conductivity that is as high as possible. The second connecting portion of the coated electric heating element is filled with a pressure transfer material and the entire fills including the inlaid coated electric heating element are pressed. The pressure transfer material is removed and the temperature-resistant sintering material is sintered.

Sand, for example, or also another corresponding material is suitable as the pressure transfer material. Ceramic powder, for example, or also another material corresponding to the requirements can be used as the sintering material.

In an embodiment, the coating of the electric heating element can be removed by melting it out and/or by burning it out and/or by chemical removal. Depending on the material used for the coating, a corresponding method step can be taken. For example, varnishes can be removed well using a chemical removal. Waxes, on the other hand, can be melted out very well.

In one embodiment, the steps of removing the coating of the electric heating element and/or of removing the removable filling material and/or the firing or respectively sintering of the temperature-resistant material can be combined into one method step.

Generally, the filling material must be removed. Particularly preferably, the removable filling material and the coating of the wire can be removed in the same process step. The filling material should therefore, with respect to the step of removal, preferably be selected with similar material properties as the coating. For example, a casting resin or wax can be used as the filling material.

If, for example, a wax is used, it can be melted out even without direct contact with air/oxygen. The wax can melt out and flow/penetrate into the pressure transfer material. If, however, removal by burning out is used, it needs, in contrast, contact with air/oxygen.

Depending on which material is used as the sintering material and how the pressing process is carried out, the pressure transfer material can, in addition, be removed before the sintering and simultaneous removal of the coating, in particular by burning out, when the green body with the embedded heating wire or respectively electric heating element has sufficient stability.

Alternatively, the coating or respectively filling material can be removed before the firing. The at least one coating material can also be selected such that it has a lower melting temperature and a lower flash point than the temperature-resistant material.

Furthermore, in an embodiment the electric heating element can be shaped in the shape of a heating wire by bending and/or winding the heating wire to form heating wire rows and/or by folding to form heating wire packages. This represents a very simple type of production of the required electric heating elements. In particular, the electric heating element can be formed as a heating wire, particularly preferably as a single continuous heating wire.

Shaping the heating wire comprises both the bending or winding of the heating wire to form heating wire rows and the subsequent folding to form heating wire packages, so that various versions with regard to length and shape of the shaped heating wire result and the appearance of the fully shaped heating wire can be optimized as needed.

If the heating wire is bent to form heating wire rows, a limited leg length of the heating wire results due to the method or respectively the machine. When winding the heating wire over a bolt, the leg length can be set variably depending on the size of the bolt. It is also possible to bend the heating wire using other winding methods, such as the double pin winding method.

In addition, hot bending or stress-relief annealing can take place as needed, wherein this is dependent on the dimensioning of the overall structure and whether it can warp or respectively shears due to stress.

If, generally or in particular after the stress-relief annealing of the heating wire or respectively generally of the electric heating element and before the coating of the heating wire/electric heating element, centering profiles are applied to the non-bent portions of the heating wire, the heating wire or respectively the electric heating element is centered better in the later channel and support structure. This causes an optimized through-flow of gas through the support and channel structure. In addition, guide elements can be used, in which the shaped wire can be inserted in order to hold it in shape.

In particular, wax and/or plastic and/or gel and/or varnishes can be used as the at least one material of the coating material.

In a further improved embodiment, the coating material can comprise at least one layer of a viscous or paste-like release agent and at least one layer of a non-viscous material. In particular, polyethylene or another suitable polymer can be used as the non-viscous material.

Furthermore, the wire can be coated with a material or respectively a material system with a low melting point or respectively flash point, wherein "lower" or "lesser" refers namely to the material with which the casting mold is filled.

The temperatures necessary for melting out or burning out the coating are in particular dependent on the type of coating material, in particular on its melting and/or flash temperature. Since wax and/or plastic, for example, are used as the low-melting or respectively—flammable coating material, the temperatures necessary for melting or burning out the coating are considerably below the temperatures necessary for sintering or firing the monolith. As a result, the steps of removing and firing or respectively sintering can advantageously be combined into one method step.

By forming the monoliths around the fully shaped, continuous heating wire, different support and channel structures can be formed depending on the shape of the coated heating wire. The flow channel cross-section along the gas flow direction can be set; the thicker the coating of the heating wire is formed, the larger the hollow spaces, meaning the final gas channels, between the heating wire and the monolith body are.

For a special production method, in which the wire is selected with a material of a lower melting point compared to the material selected for casting, the same material or a similar material or a material that has, in relation to the step of removal, at least similar properties, can be used for filling the lower region of the casting mold until the bends are covered. If, for example, a resin or a wax is used, the region around the bends can be melted or also burned away along with the coating of the wire.

In another embodiment, the coating material, with regard to its thickness, can be formed non-uniformly at least in portions on the electric heating element. In doing so, different thicknesses on the electric heating element can be formed, which leads to a non-homogeneous structure of the channel and support structure in the monolithic structure. In particular, this makes possible a large variability in the design of the channel and support structure that can be formed in this way. Inside the channel structure, larger chambers can be designed, which can then have a positive effect on the heating of the flowing gas. However, complex internal channel structures can also be formed in order, for example, to calm flows or also to design them on purpose to be turbulent. The variable-thickness coating of the heating wire makes it possible to set the flow channel cross-section in a targeted manner. If a material system consisting of at least one non-viscous and at least one viscous material is used, the non-viscous material can serve via its thickness to define the diameter of the channel and support structure to be shaped, while the viscous material serves as a release agent between the heating wire coated with the non-viscous material and the temperature-resistant material and thus simplifies the processing.

The gas heater heating element, produced according to one of the gas heater heating element production methods according to the invention, has according to its arrangement a monolith/monolithic body with a support and channel structure, wherein the support and channel structure is formed in a monolith production process and introduced non-subsequently, and at least one continuous electric heating element guided through the support and channel structure in the monolith.

The support and channel structure of the monolith/monolithic body can be shaped non-uniformly at least in portions with regard to the inner diameter of the support and channel structure. Furthermore, the support and channel structure of the monolith/monolithic body can be shaped non-uniformly at least in portions with regard to the distance between the channels of the channel portion of the support and channel structure.

The gas heater heating element can also have one or respectively multiple monoliths/monolithic bodies with one or respectively a respective support and channel structure and a corresponding electric heating element. Here, the monoliths can be arranged next to each other as well as one behind another.

Since the monolith can also be designed variably in shape, an integration of the gas heater heating element into various housings is possible. In addition, a vertical integration of the gas heater heating element can be performed easily. The monolith can also have reflector elements for reflecting thermal radiation, which are embedded or attached in edge regions and/or in the outside region of the monolithic structure.

BRIEF DESCRIPTION OF THE DRAWINGS

Exemplary embodiments of the invention will be described in detail in the figure description below with reference to the attached drawings, wherein this is intended to explain the invention and is not to be considered limiting.

DETAILED DESCRIPTION OF THE INVENTION

In the following figure descriptions, functionally identical components are provided with the same reference signs.

Figure 1:
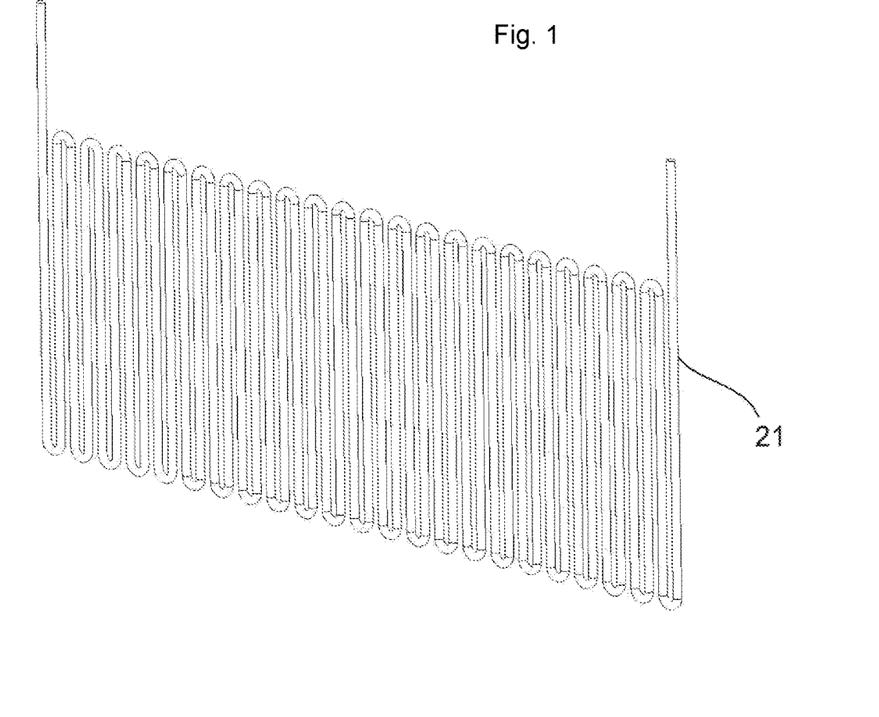
FIG. 1 schematically illustrates an embodiment of a bent heating wire.

FIG. 1 shows a bent heating wire 21 in the form of a heating wire row. In this manufacturing version of the heating wire row, there is a limited leg length.

Figure 2:
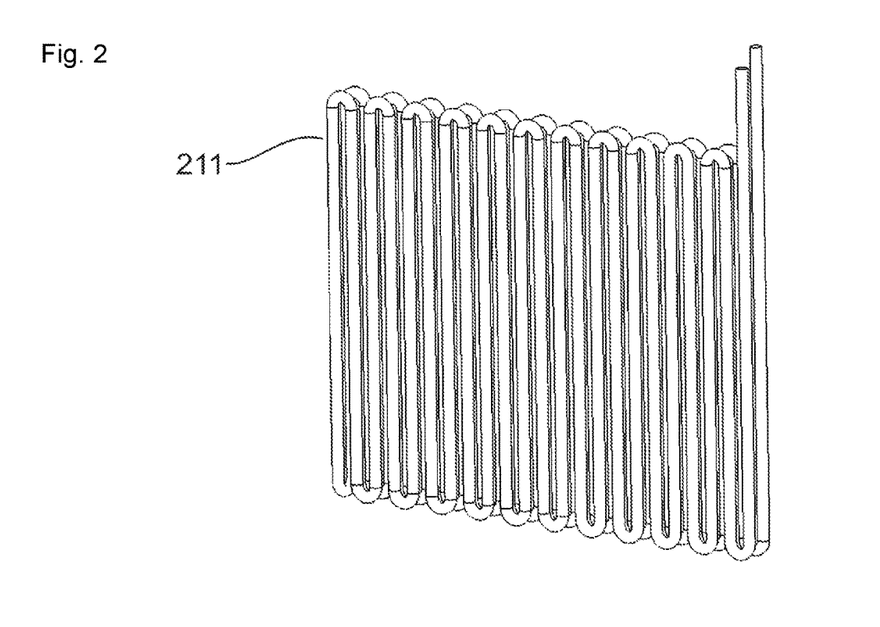
FIG. 2 schematically illustrates an embodiment of a bent heating wire folded to form a heating wire package.

FIG. 2 shows the bent heating wire 21 from FIG. 1 folded out to form a heating wire package made of bent heating wire 211.

Figure 3:
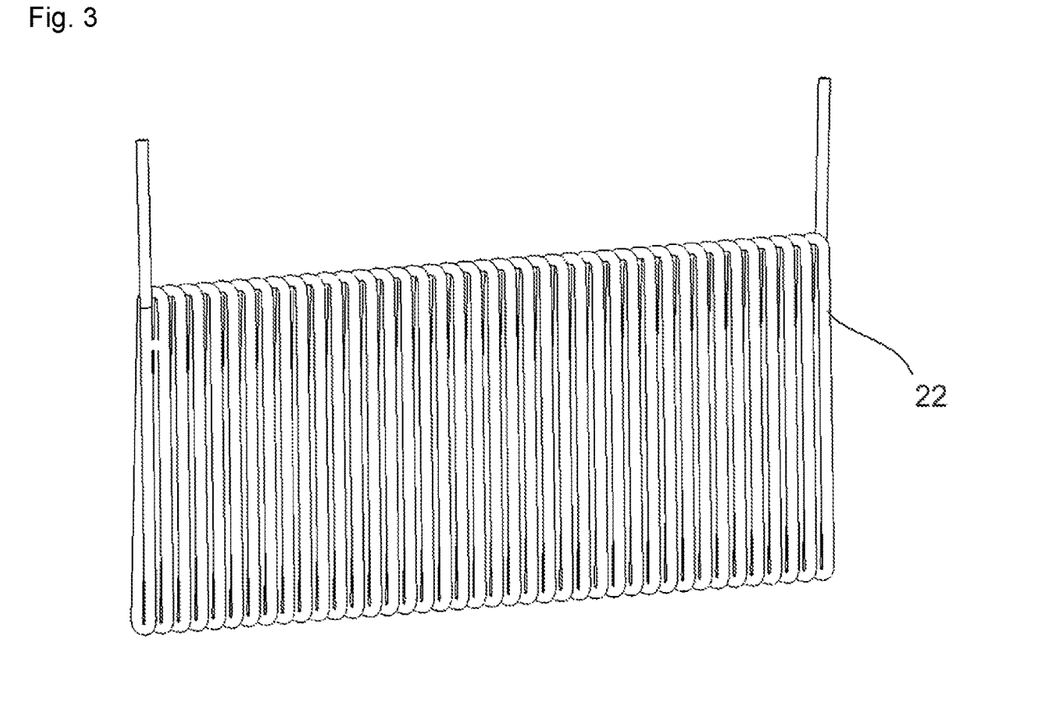
FIG. 3 schematically illustrates an embodiment of a wound heating wire.

FIG. 3 shows a wound heating wire 22 in the form of a heating wire row. In this manufacturing version of the heating wire row, there is a variable leg length depending on the bolt used. The bolt can be designed with a variable size and shape. Other winding methods can also be used for manufacturing.

Figure 4:
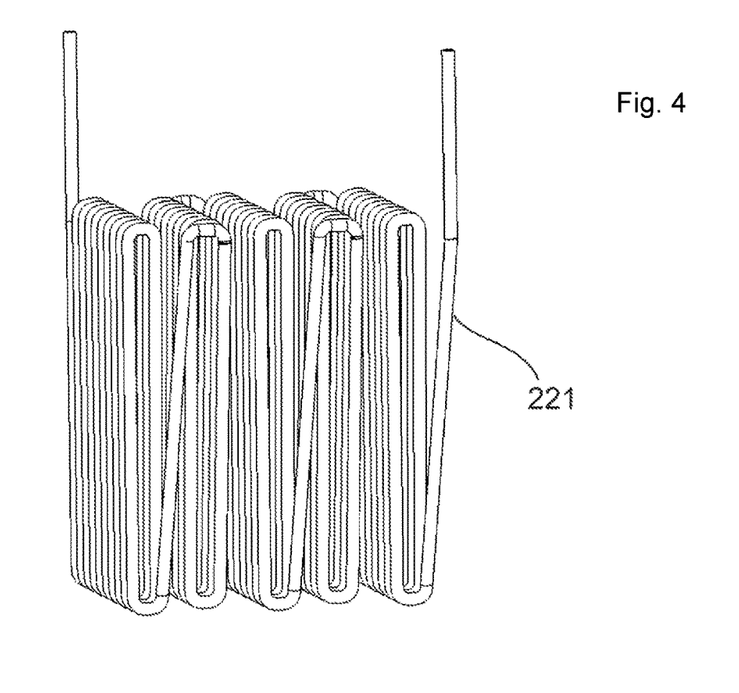
FIG. 4 schematically illustrates an embodiment of a wound heating wire folded to form a heating wire package.

FIG. 4 shows the wound heating wire 22 from FIG. 3 folded out to form a heating wire package made of bent heating wire 221.

Figure 5:
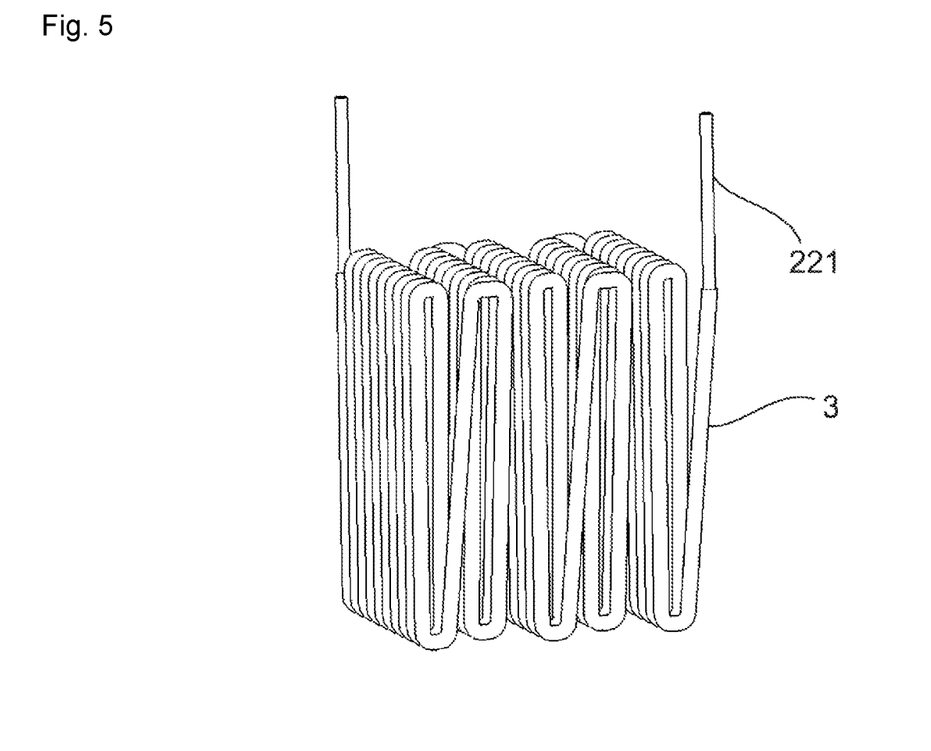
FIG. 5 schematically illustrates an embodiment of a heating wire package after coating.
Figure 9:
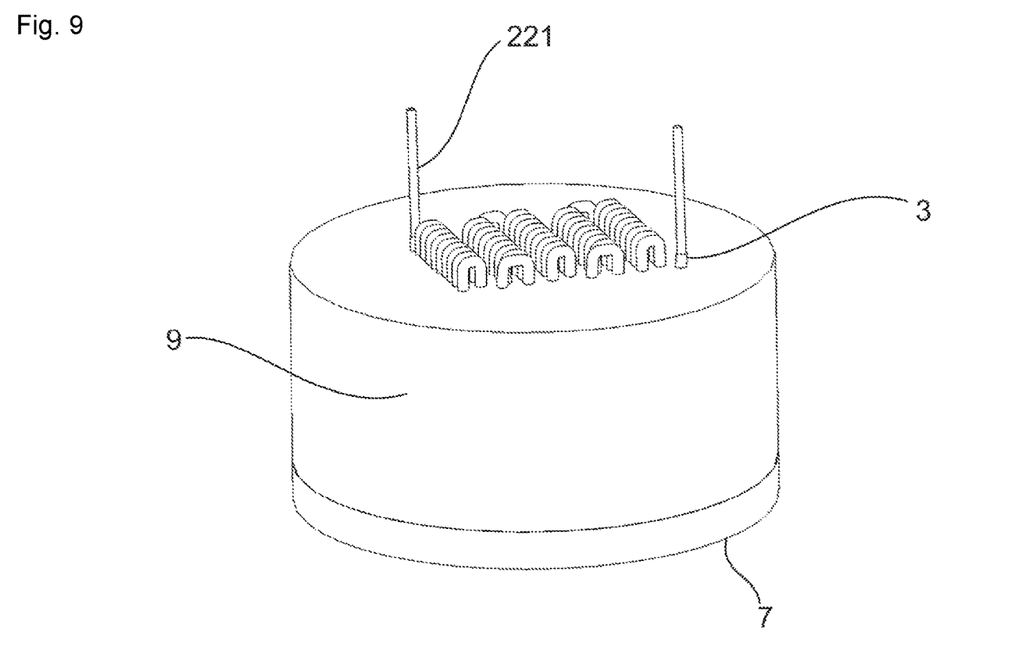
FIG. 9 schematically illustrates an embodiment of a coated heating wire package fixed and cast outside of the casting mold before melting out and firing.

In FIG. 5, a heating wire package made of wound heating wire 221 can be seen after coating with a material with a low melting point or respectively lower flash point 3 compared to the embedding material 9 (cf. FIG. 9). The coating 3, shown shaded, is applied to the heating wire with a uniform outer radius. Alternatively, the coating can be shaped with an inhomogeneous thickness or respectively with a varying outer radius and/or from a material system consisting of multiple materials with a sufficiently lower melting temperature or respectively lower flash point with respect to the embedding material. In the following figures, the shading of the coated wires will be omitted for the sake of clarity, even when the heating wire is coated in the respective exemplary embodiment.

Figure 6:
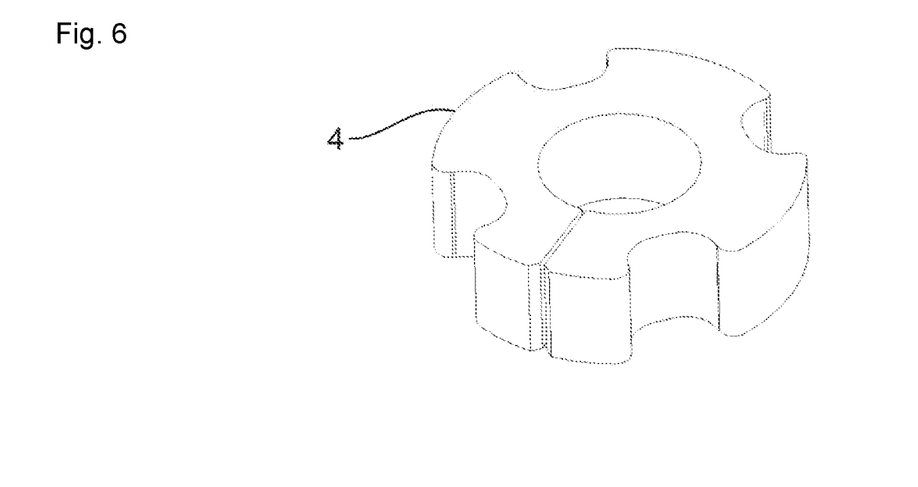
FIG. 6 schematically illustrates an embodiment of a centering profile.

FIG. 6 shows a possible embodiment of a centering profile 4 for better centering of the heating wire in the later support and channel structure 11. The centering profiles 4 are placed onto the vertical portions of the heating wire, before or after the application of the coating 3 to the heating wire, at previously established intervals before the additional manufacturing steps.

Figure 7:
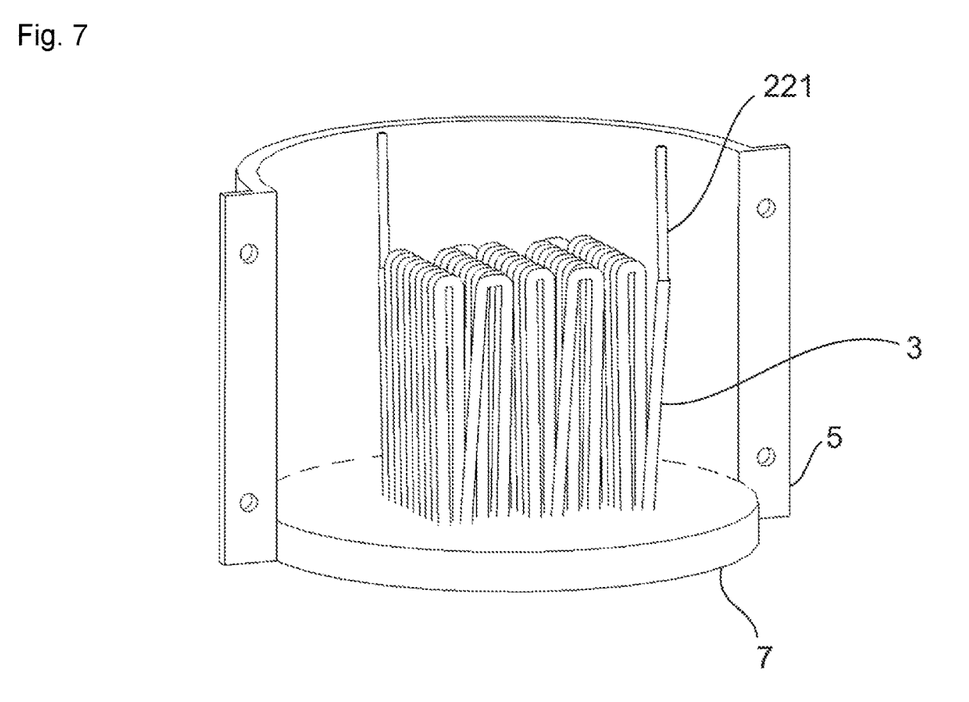
FIG. 7 schematically illustrates an embodiment of a coated heating wire package fixed in a casting mold.

FIG. 7 shows a half shell of a casting mold 5, in which a coated heating wire package made of wound heating wire 221 with a coating 3 is fixed. The casting mold 5 is cast with a removable filling material 7 until the lower bends of the coated heating wire package made of wound heating wire 221 are completely covered.

Figure 8:
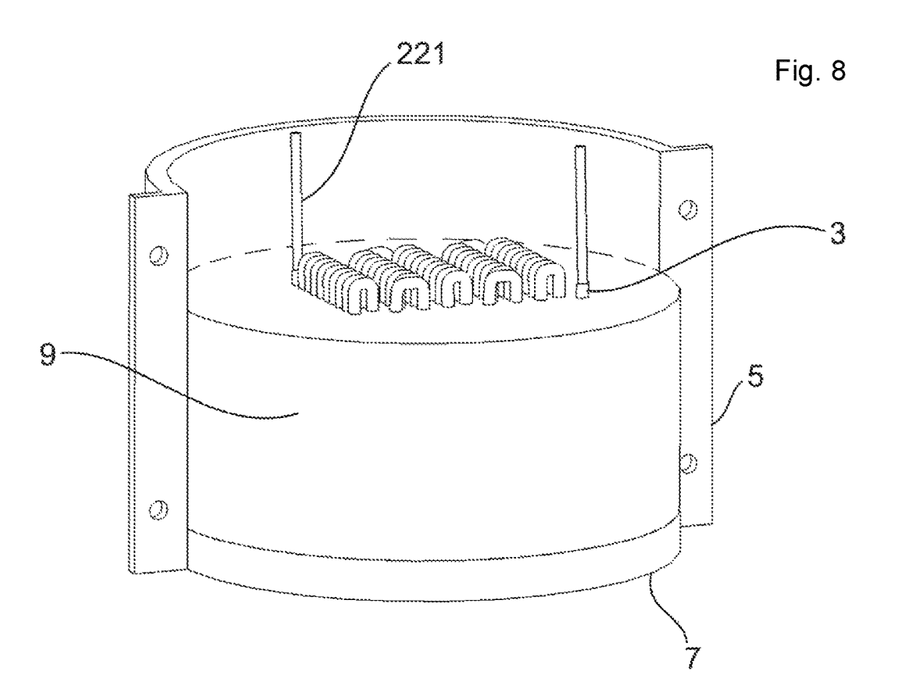
FIG. 8 schematically illustrates an embodiment of a coated heating wire package fixed and cast into a casting mold.

In FIG. 8, the casting mold 5 from FIG. 7 is cast with a temperature-resistant/ceramic embedding material 9 such as concrete until the upper bends of the coated heating wire are not cast over. Particularly preferably, fire-resistant concrete is used for the embedding material 9, in which an Al2O3-rich cement is used.

FIG. 9 shows the coated heating wire package made of wound heating wire 221 from FIG. 8, cast into a removable filling material 7 and a temperature-resistant/ceramic embedding material 9, after removal from the casting mold 5 and before melting out and/or burning out the removable filling material and the coating of the heating wire package. The temperature-resistant/ceramic embedding material 9 is cured or respectively has been cured before the removal of the casting mold.

Figure 10:
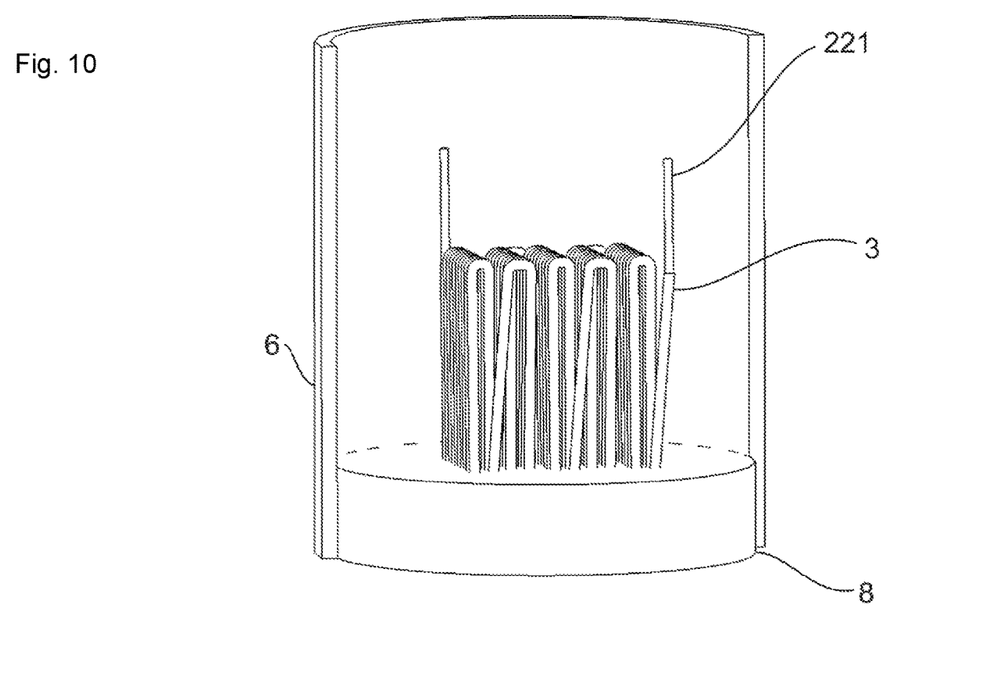
FIG. 10 schematically illustrates an embodiment of a coated heating wire package fixed in a press mold.

FIG. 10 shows a half shell of a press mold 6, in which a coated heating wire package made of wound heating wire 221 with a pressure transfer material 8, such as sand, is fixed. The pressure transfer material 8 is filled in until the lower bends of the coated heating wire package made of wound heating wire 221 are completely covered. The pressure transfer material has been poured into the press mold 6 and then compressed. To ensure a sufficient fixing of the wound heating wire 221, one or more holding devices can be used in the associated manufacturing step. The pressure transfer material can be compressed, for example, by shaking and/or pressing.

Figure 11:
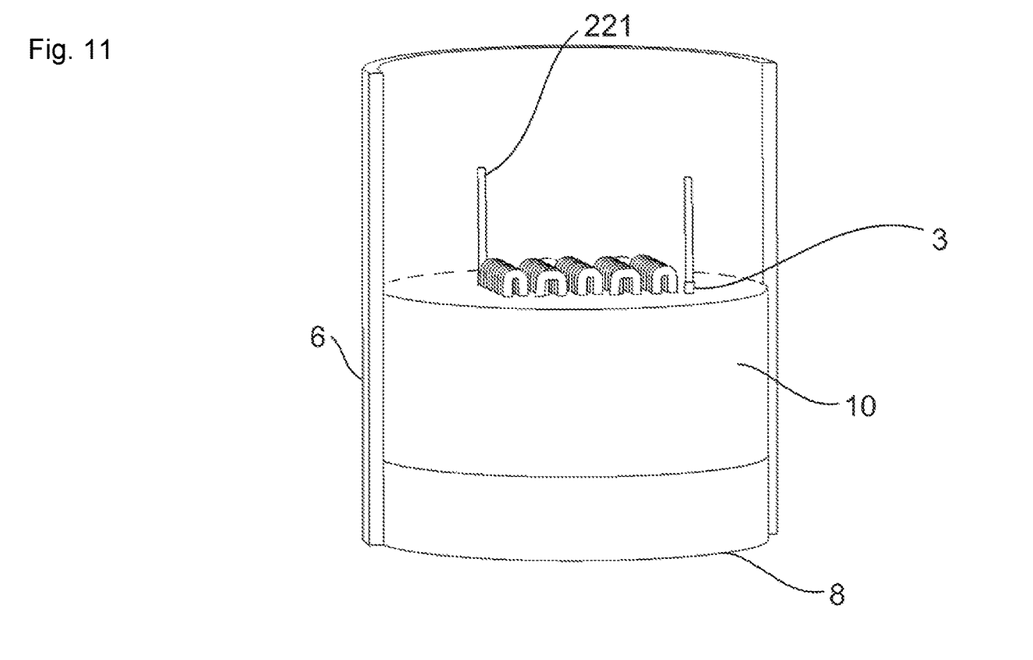
FIG. 11 schematically illustrates an embodiment of a coated heating wire package fixed in a press mold and filled with sintering material.

In FIG. 11, the press mold 6 from FIG. 10 is filled with a sintering material 10 such as ceramic powder until the upper bends of the coated heating wire 221 are not filled over.

Figure 12:
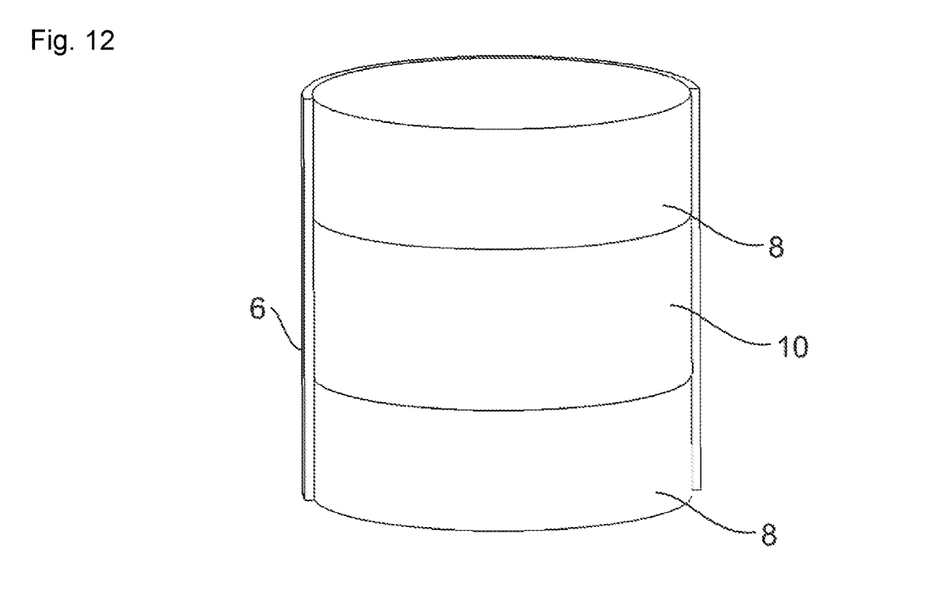
FIG. 12 schematically illustrates an embodiment of a coated heating wire package in a press mold, completely covered.

In FIG. 12, the press mold 6 from FIG. 11 is filled with a pressure transfer material 8 until the coated heating wire package is completely covered. The press mold 6 containing the coated heating wire package made of wound heating wire is thus filled with three layers (pressure transfer material-sintering material-pressure transfer material) lying on top of each other.

Figure 13:
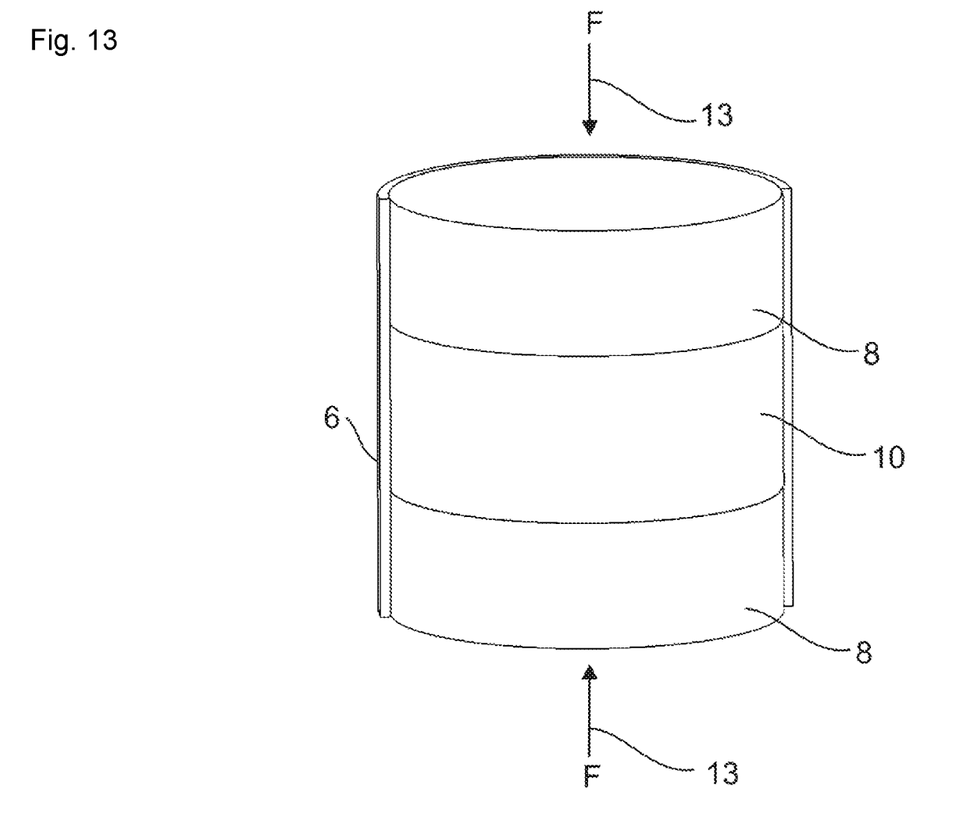
FIG. 13 schematically illustrates an embodiment of a pressing for generating a heating wire package green body.

FIG. 13 schematically shows the force F 13 acting on the coated heating wire package in the completely filled press mold 6 during the pressing process. In the pressing process, the sintering material 10 is pressed in the press mold 6 to form a green body.

Figure 14:
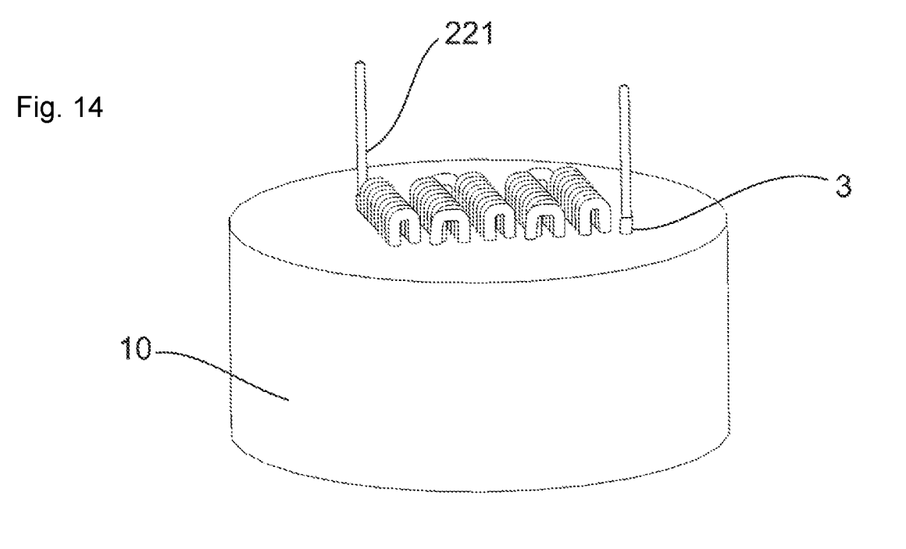
FIG. 14 schematically illustrates an embodiment of a heating wire package green body after removing the unpressed pressure transfer material and before melting out and sintering.

FIG. 14 shows the green body containing the coated heating wire package 221 after removing the press mold 6 and the pressure transfer material 8 and before removing the coating and the sintering of the green body 10.

Figure 15A:
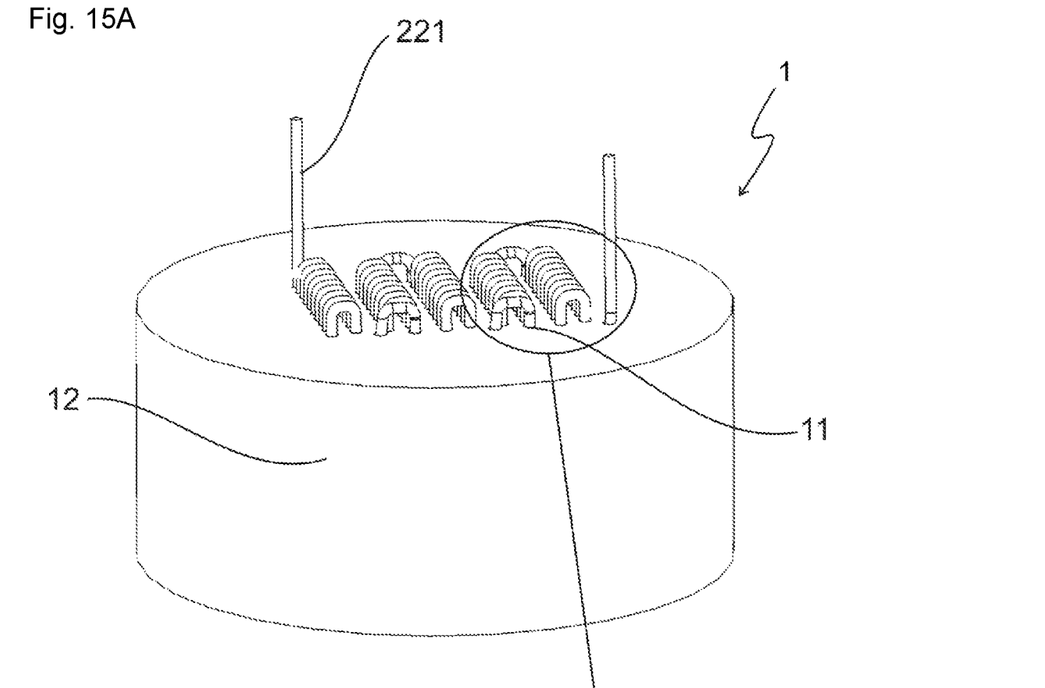
FIG. 15a schematically illustrates an embodiment of a completed gas heater heating element with an exposed gas channel structure after melting out and firing or sintering.

FIG. 15a shows a completed gas heater heating element 1 having a monolith 12 with a support and channel structure 11, through which a heating wire package made of wound heating wire 221 runs. For the completion of the gas heater heating element 1, the coating 3 was removed from the coated and cast heating wire package made of wound heating wire 221 from FIG. 9 or from the green body containing the coated heating wire package from FIG. 14 by melting and/or burning, which has led to the formation of the support and channel structure 11 in the monolith 12. Then, as the last manufacturing step for producing the monolith, the cast-in heating wire package was burned or the green body containing the heating wire package was sintered, depending on the production method in a casting mold 5 or a press mold 6.

Figure 15B:
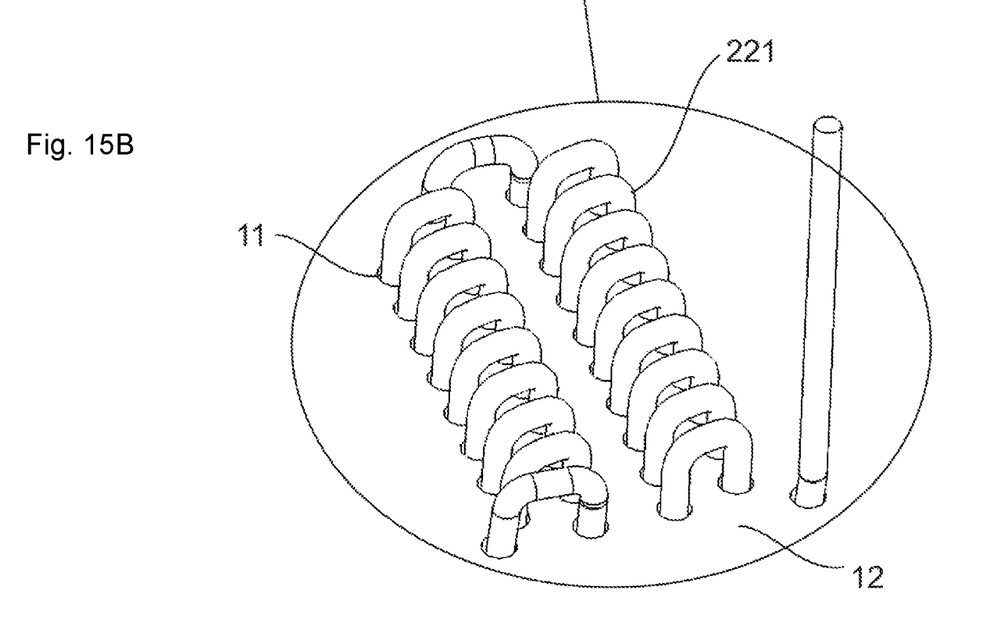
FIG. 15b illustrates an enlarged schematic representation of a complete gas heater heating element with an exposed gas channel structure after melting out and firing or sintering.

FIG. 15b shows an enlarged representation of the completed gas heater heating element 1 from FIG. 15a. The openings of the support and channel structure 11, from which the windings of the wound heating wire 221 extend, can be seen clearly. The monolith is interspersed with a channel structure, which has openings in the vicinity of the bends of the electric heating element and through which gas can be conducted for the purpose of heating.

The structure of the gas heater heating element 1 is self-supporting. The heating wire is combined into one component with the support and channel structure 11. It is characteristic that the monolith 12 containing the support and channel structure 11 is formed in one process, as illustrated in the figures above. Additional functional combinations, such as thermal insulation, electrical insulation, gas conduction, or catalyst support structure, are possible.

Figure 16A:
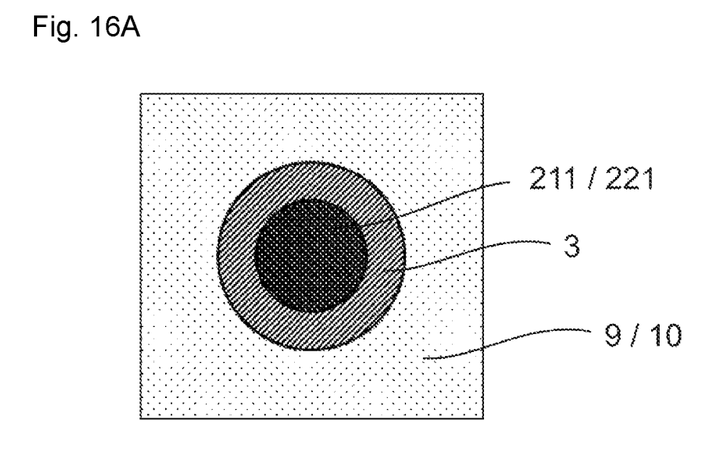
FIG. 16a schematically illustrates an embodiment of a gas heater heating element in a monolithic structure.
Figure 16B:
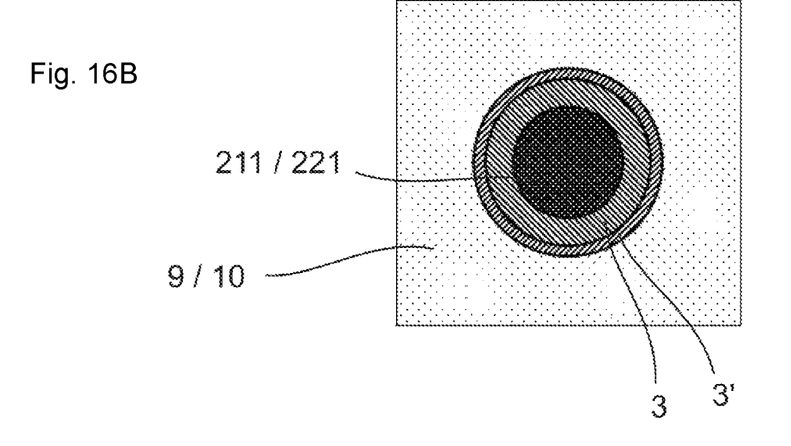
FIG. 16b schematically illustrates another embodiment of a gas heater heating element in a monolithic structure.
Figure 16C:
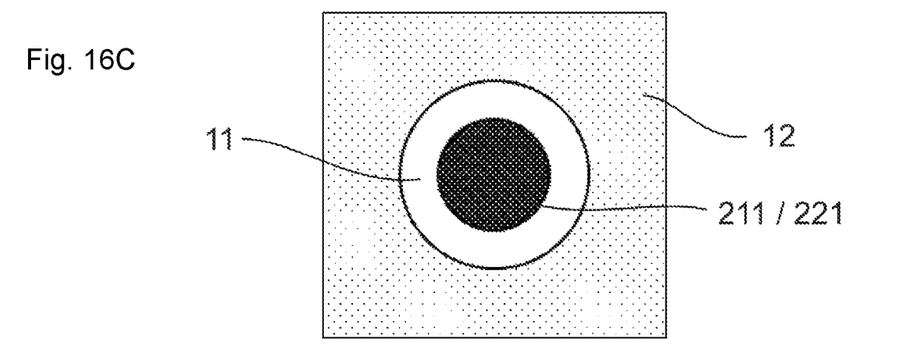
FIG. 16c schematically illustrates another embodiment of a gas heater heating element in a monolithic structure.

FIGS. 16a and 16b show the coated heating wire 211/221 in the volume material of the monolith 9/10 before removing the coating by melting out/burning out and firing/sintering of the volume material. In FIG. 16a, the heating wire 211/221 is only sheathed by one material 3; in FIG. 16b, a sheath made of a material system consisting of 2 layers 3 and 3' is indicated. FIG. 16c shows the exposed wire 311/221 after removing the coating by melting out/burning out and firing/sintering of the volume material, so that the support and channel structure 11 is formed in the monolith 12.

The aforementioned exemplary embodiments are intended to explain the invention without limiting its scope of protection.

LIST OF REFERENCE SIGNS

1 Gas heater heating element
21 Bent heating wire
211 Heating wire package made of bent heating wire
22 Wound heating wire
221 Heating wire package made of wound heating wire
3, 3' Coating
4 Centering profile
5 Casting mold
6 Press mold
7 Removable filling material
8 Pressure transfer material
9 Temperature-resistant material/ceramic embedding material
10 Sintering material
11 Support and channel structure
12 Monolith
13 Force action F

The invention claimed is:

1. A method of manufacturing a gas heater heating element including a support and channel structure with a plurality of channels formed in a monolith, comprising:
    shaping an electric heating element;
    at least partially coating the electric heating element with at least one coating material;
    introducing the at least partially coated electric heating element into a mold for producing the monolith;
    producing the monolith to surround the at least partially coated electric heating element; and
    removing the coating material of the at least partially coated electric heating element,
    wherein the gas heater heating element includes at least one electric heating element in the monolith,
    wherein the electric heating element is guided in the plurality of channels of the support and channel structure, and
    wherein heat within the plurality of channels is transferred by the electric heating element to a gas flowing through the plurality of channels to heat the gas.

2. The method according to claim 1, wherein the electric heating element is formed as one of: (i) a heating wire; (ii) a heating wire comprising a variable diameter; (iii) a heating wire comprising a variable geometric structure; (iv) multiple different heating wires; (v) a heating lattice; and (vi) heating lattice structures.

3. The method according to claim 1, wherein the electric heating element at least partially comprises a homogeneous shape.

4. The method according to claim 1, wherein the electric heating element comprises:
    a first connecting portion formed outside the monolith and on a gas inflow side;
    a channel portion formed inside the monolith; and
    a second connecting portion formed outside the monolith and on a gas outflow side.

5. The method according to claim 4, wherein the producing of the monolith takes place using a casting mold and comprising:
    inserting the shaped and at least partially coated electric heating element into the casting mold;
    filling the casting mold with removable filling material until the first connecting portion of the coated electric heating element is completely covered;
    curing the removable filling material;
    casting into the casting mold with a temperature-resistant material which can be cured at temperatures higher than 800° C., and has a high electrical resistance and high thermal conductivity, wherein the second connecting portion of the coated electric heating element remains uncast;
    removing the removable filling material; and
    firing the temperature-resistant material.

6. The method according to claim 4, wherein the producing of the monolith comprises:
    inserting the shaped and at least partially coated electric heating element into a press mold;
    filling the press mold with a pressure transfer material until the first connecting portion of the at least partially coated electric heating element is completely covered;
    filling the press mold with a sintering material which forms a green body, wherein the second connecting portion of the at least partially coated electric heating element remains unfilled, and wherein the green body is temperature-resistant at temperatures higher than 800° C. and comprises a high electrical resistance and thermal conductivity;
    filling the second connecting portion of the at least partially coated electric heating element with a pressure transfer material;
    pressing the fills including the at least partially coated electric heating element;
    removing the pressure transfer material; and
    sintering the temperature-resistant sintering material.

7. The method according to claim 1, wherein the at least partial coating of the electric heating element is removed by at least one of: (i) melting; (ii) burning; and (iii) chemical removal.

8. The method according to claim 1, further comprising at least one of:
    (i) removing the removable filling material; and
    (ii) firing or sintering a temperature-resistant material.

9. The method according to claim 1, wherein the at least one coating material comprises a lower melting temperature and a lower flash point than a temperature-resistant material.

10. The method according to claim 1, wherein the electric heating element comprises a heating wire shaped by at least one of: (i) bending the heating wire; (ii) winding the heating wire to form heating wire rows; and (iii) folding the heating wire to form heating wire packages.

11. The method according to claim 1, wherein the electric heating element comprises an individual continuous heating wire.

12. The method according to claim 1, wherein the at least one coating material comprises at least one of: (i) wax; (ii) plastic; (iii) gel; and (iv) a varnish.

13. The method according to claim 1, wherein the at least one coating material comprises at least one layer of a viscous release agent and at least one layer of a non-viscous material.

14. The method according to claim 1, wherein the at least one coating material comprises a non-uniform thickness on portions of the electrical heating element.

15. The method of claim 1, wherein the heat within the heating channels is configured to be transferred by the electric heating element to a gas flowing through the channels to achieve high gas temperatures.

16. The method according to claim 1, wherein the electric heating element at least partially comprises an inhomogeneous shape.

* * * * *